Oct. 5, 1943.   H. W. HEM   2,331,091
INDICIA EXHIBITING MEANS
Filed March 24, 1939   4 Sheets-Sheet 1
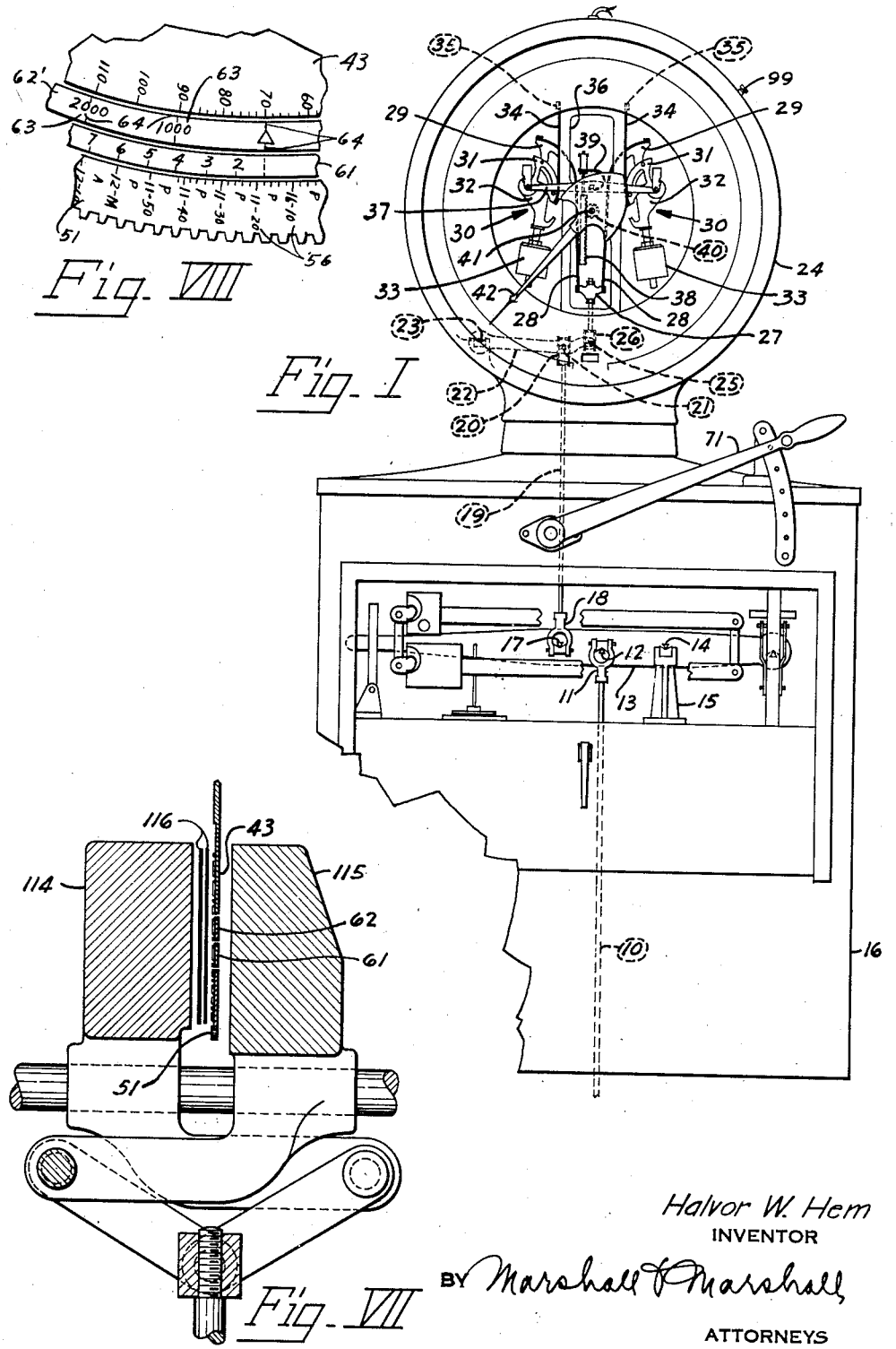
Halvor W. Hem
INVENTOR
BY Marshall & Marshall
ATTORNEYS Oct. 5, 1943.   H. W. HEM   2,331,091
INDICIA EXHIBITING MEANS
Filed March 24, 1939   4 Sheets-Sheet 2
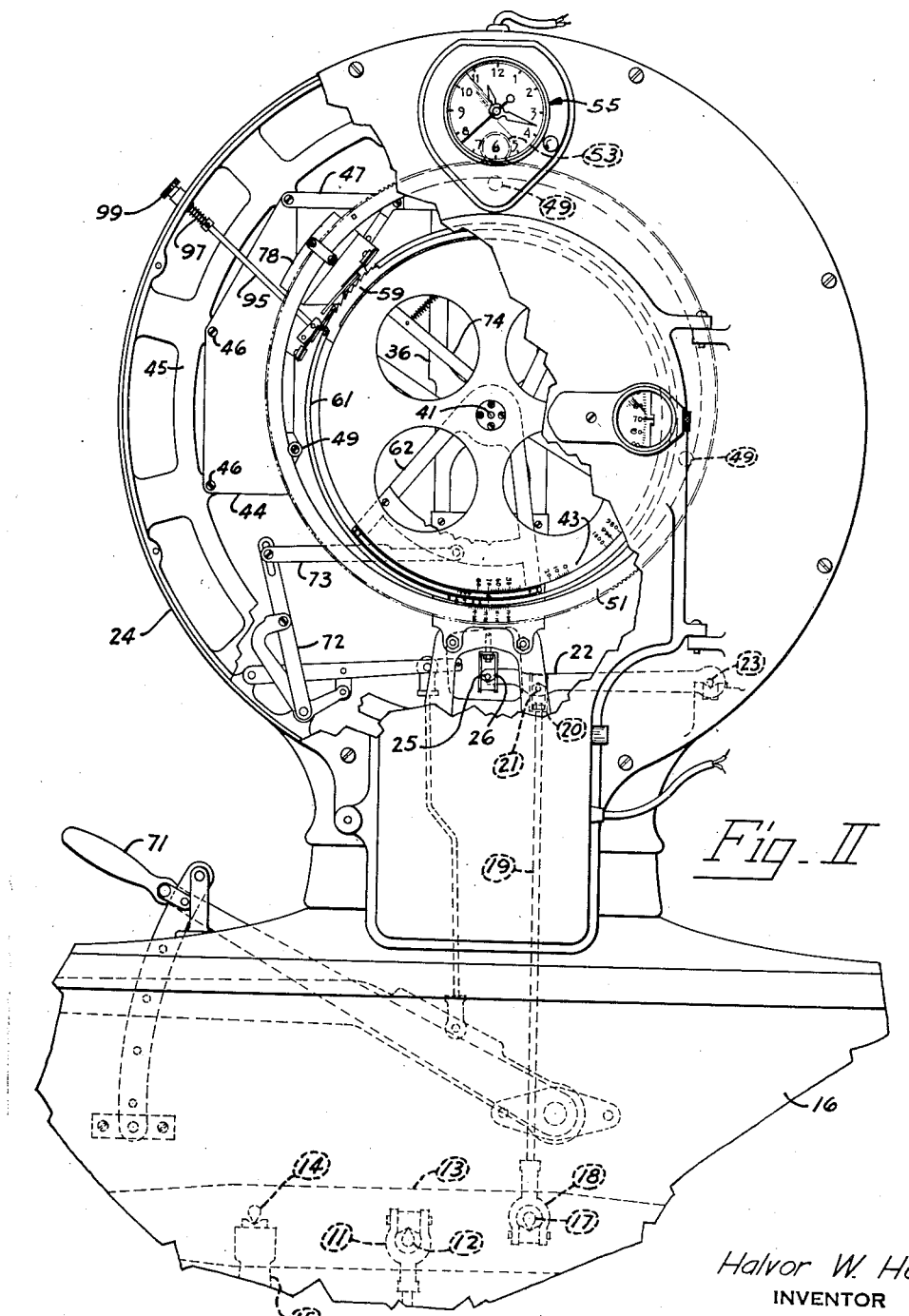
Fig. II
Halvor W. Hem
INVENTOR
BY Marshall & Marshall
ATTORNEYS

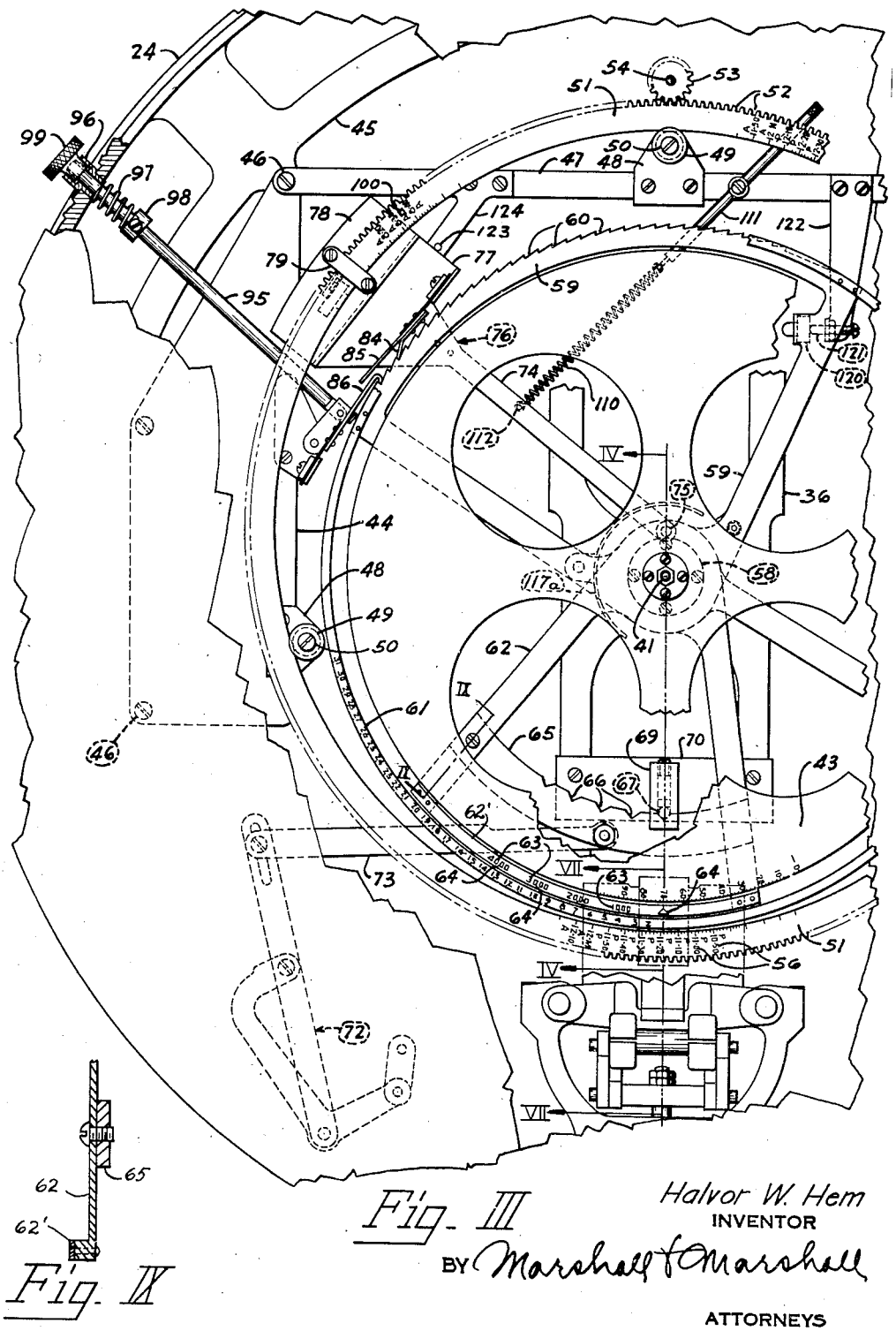

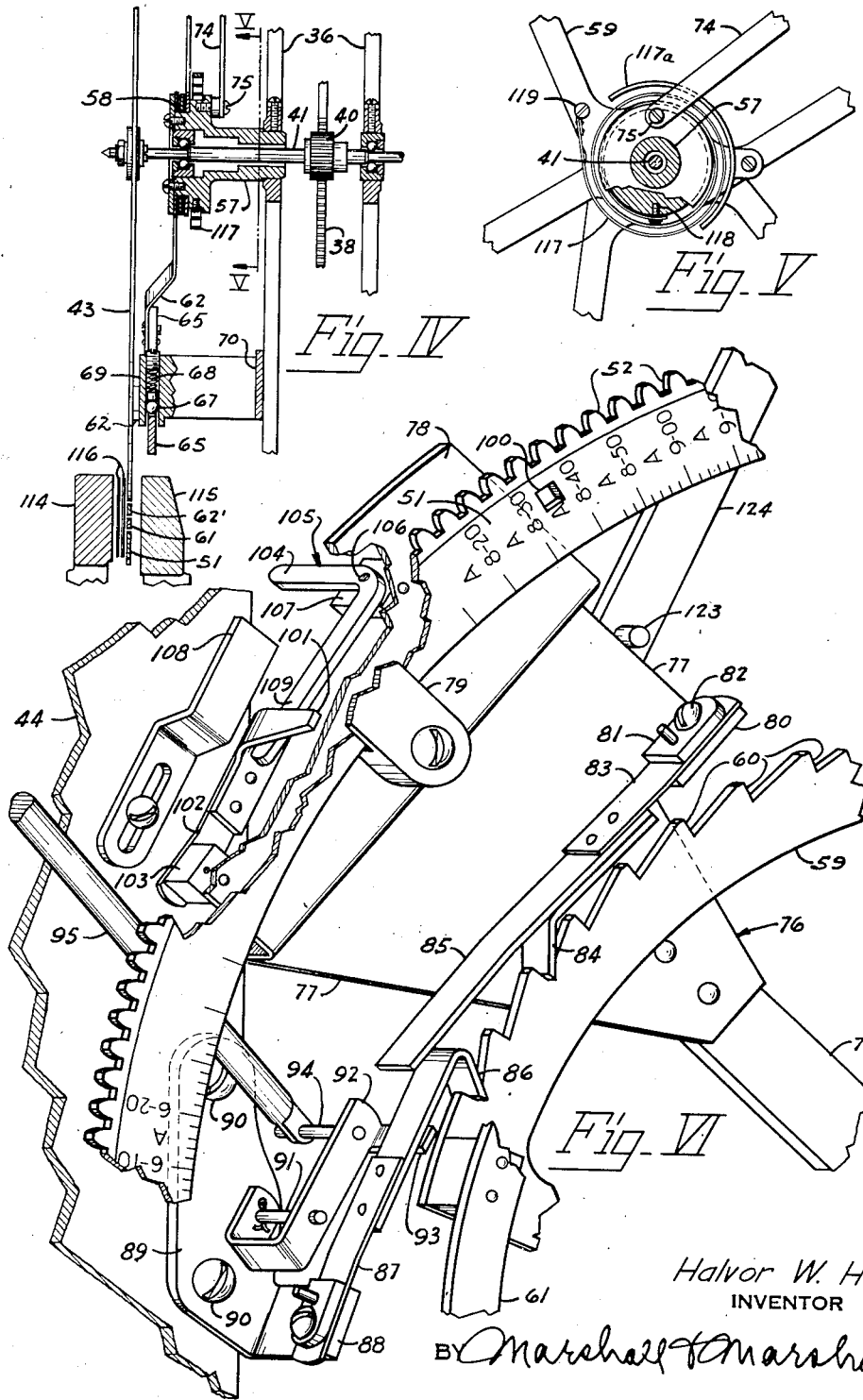

Patented Oct. 5, 1943

2,331,091

UNITED STATES PATENT OFFICE 2,331,091

INDICIA EXHIBITING MEANS

Halvor W. Hem, Toledo, Ohio, assignor to Toledo Scale Company, Toledo, Ohio, a corporation of New Jersey Application March 24, 1939, Serial No. 263,949

2 Claims. (Cl. 234—6)

This invention relates generally to weighing scales, and more particularly to weighing scales which are adapted to print the hour of the day and the day of the month, as well as the weight of a load as determined by the scale mechanism. Scales of this type are required usually for continuous processes such as, for example, the feeding of chlorine in the purification of water in water works. In this process a tank of liquid chlorine is placed on the platform of a scale and the valve set so that a certain amount of chlorine passes into the water supply per unit of time, the scale indicating continuously the amount of chlorine remaining in the tank. A printed record is made at prescribed intervals so that the chemist in charge may know exactly the rate at which chlorine was added at any time.

The principal object of this invention is the provision of improved means for automatically and continuously setting up type representing the hour of the day and the day of the month.

Another object is the provision of improved means for automatically changing type representing the day of the month, at the expiration of every 24 hours; and, A still further object is the provision of improved means for manually resetting the date type at the expiration of every month.

These, and other objects and advantages will be apparent from the following description in which reference is had to the accompanying drawings, illustrating a preferred embodiment of the invention and in which similar reference numerals refer to similar parts throughout the several views.

Referring to the drawings:

Fig. I is a front elevational view of a scale in which the invention is embodied.

Fig. II is an enlarged fragmentary rear elevational view, parts being broken away.

Fig. III is a further enlarged fragmentary rear elevational view showing the indicia bearing members in greater detail.

Fig. IV is an enlarged fragmentary sectional view substantially along the line IV—IV of Fig. III.

Fig. V is a sectional view substantially along the line V—V of Fig. IV.

Fig. VI is an enlarged fragmentary perspective view showing in detail the operative relation between the time and day rings; and, Fig. VII is a sectional view through the indicia bearing members and the imprinting means substantially along the line VII—VII of Fig. III.

Fig. VIII is a fragmentary elevational view showing the arrangement of indicia-bearing members.

Fig. IX is a fragmentary sectional view substantially along the line IX—IX of Fig. III.

Referring to the drawings in detail:—

This invention may be embodied in any scale which is provided with a rotating printing indicia member in which the record is pressed against the type. Such scales may, or may not have, directly visual indicating means such as a relatively movable chart and pointer. Accordingly, a scale per se is shown and described herein only so far as it is necessary to fully disclose the present invention.

The mechanism shown in Fig. I is adapted to be connected to a load receiving platform mechanism (not shown) and a "pull" resulting from a load on such mechanism is transmitted through a rod 10, a suitable stirrup 11 suspended from a load pivot 12, to a beam 13 which, by means of a pivot 14, is fulcrumed upon a stand 15 in the interior of a cabinet 16. A power pivot 17, positioned in the beam 13 in spaced relation to the pivots 12 and 14, engages a stirrup 18 on the lower end of a connecting rod 19 whose upper end, by means of a stirrup 20, engages a load pivot 21 fixed in a pendulum lever 22. This lever 22 is fulcrumed at 23 upon a suitable bearing fixed in the interior of a chart housing 24 which surmounts the cabinet 16. The free end of the lever 22, by means of a pivot 25, engages a bearing in a stirrup 26 suspended from an equalizing crosshead 27 which in turn is secured to the lower end of flexible metallic ribbons or tapes 28 whose upper ends overlie and are fastened to power sectors 29 of load counterbalancing pendulums 30. In addition to the power sectors 29, each of these pendulums 30 comprises a pair of fulcrum sectors 31, one of which is positioned on each side of the power sector, a pendulum body 32 and an adjustable pendulum weight 33. Metallic ribbons 34, which overlie and are fastened to the arcuate faces of the fulcrum sectors 31, have their other ends clamped at 35 to parallel faces of a sector frame 36 which is bolted in the interior of the housing 24 and serves as a suspension means for the pendulums. When the load is placed on the load receiving platform of the scale, the "pull" resulting therefrom is transmitted through the mechanism just described to the equalizing crosshead 27 which as it moves downwardly under the action of this pull communicates it through the ribbons 28 and the power sectors 29 to the pendulums 30. These, in the well known manner, roll up on the ribbons 34 and the pendulum weights 33 move outwardly and upwardly until their weight moments exactly counterbalance the moment of the load on the platform.

Since the distance of this upward movement is directly proportional to the weight of the load it may be employed for actuating indicating and weight printing means. To accomplish this, the pendulums 30 are connected by a frame 37 which pivotally engages these members at their centers of revolution. A rack 38, secured to the frame 37 by means of a shock absorbing member 39, cooperates with a pinion 40 pinned to a shaft 41 whose ends are mounted in antifriction bearings in the sector frame 36, to rotate an indicator 42 and a printing disk 43, which are fixed to the opposite ends of the shaft 41, which project beyond the faces of the sector frame 36.

To accomplish the objects of this invention a plate 44 (Figs. III and VI) is secured to an inwardly projecting framework 45 in the interior of the housing 24 by means of screws 46 to one side of the vertical axis of the housing and a similar plate (not shown) is fastened to the opposite side. The upper ends of these plates are connected by a bar 47. Secured to the plate 44 and bar 47 are small brackets 48, each of which is provided with a laterally extending spool-like member 49 rotatably mounted on screw studs 50. These spools 49, by means of their grooves, support an annulus 51. The periphery of this annulus is provided with teeth 52 which engage the teeth of a pinion 53 mounted on a shaft 54 which is in driven relation to a clock mechanism 55 actuated by a synchronous electric motor. The ratio of the gears of this clock mechanism 55, the pinion 53 and the teeth on the annulus 51 is such that the annulus 51 will rotate through 360° in exactly 24 hours. Accordingly, indicia 56, etched or embossed on one of the faces of the annulus, representing hours and minutes are adapted to record the time when an imprint is taken through the cooperation of associated means.

A shaft supporting sleeve 57, fixed in the sector frame 36 (Fig. IV) supporting one of the antifriction bearings in which the shaft 41 is journaled, is also provided with a concentric circular hub 58 forming a seat for a circular aperture near the apex of the converging sides of a ratchet sector 59 (Fig. III) whose arcuate periphery is provided with a series of ratchet teeth 60. Concentrically secured to this sector 59 is a narrow annulus 61 provided with thirty-one consecutively numbered indicia, each representing a day of a month. The sector 59 is mounted so that the face of the annulus 61 lies in the plane of the face of the printing disk 43 and the annulus 51 and closely adjacent the latter. Also fulcrumed on the hub 58 is a sector 62' comprising two substantially axially disposed arms 62 and an arcuate strip 62' located in the same plane with the face of the disk 43 and in circumferential juxtaposition therewith. The arcuate strip 62' is provided with indicia 63 representing increments of load which are offset by manipulative load counterbalancing means (not shown) such as the unit weight mechanism disclosed in Patent No. 1,423,660 to H. O. Hem and associated with each of the indicia 63 is an index mark 64 which serves as an index for all the printing indicia on the members 43, 62, 61 and 51. (Fig. VIII.) So that these index marks 64 may be invariably positioned the sector 62 is provided with a curved positioning strip 65 having a series of notches 66 (Fig. III) adapted to receive a hardened steel ball 67 which when the strip 65 is properly positioned is urged to enter these notches by the action of a spring 68 located in a bushing 69 (Figs. III and IV) on a plate 70 which is fastened to the sector frame 36.

To actuate the previously referred to manipulative counterbalancing means, a lever 71 operatively connected to such load offsetting mechanism is provided in a readily accessible position on the cabinet 16. The movement of the lever 71 which deposits the unit weight, by means not shown, is imparted to a crank means 72 (Fig. III) and an arm of this crank pivotally engages a link 73 whose other end pivotally engages the sector 62 to rotate this sector into position.

The hour and minute annulus 51 is constantly driven by the clock mechanism 55, the printing disk 43 representing the weight is actuated by the automatic load counterbalancing mechanism when a load is placed thereon and the sector 62 indicating the amount offset by the manipulative load offsetting mechanism is moved into proper position whenever the manipulative load mechanism is actuated. However, additional means must be provided to automatically change the position of the annulus 61 whose indicia represent the days of the month, at the expiration of each day. For this purpose there is provided an arm 74 (Figures III, IV and VI) pivoted at one end upon a screw 75 threaded into an expanded portion of the shaft supporting sleeve 57. Riveted to the free end of this arm 74 is a formed sheet metal bracket 76 (Figs. III and VI) having a main portion 77 lying substantially in the plane of the arm 74 and an offset portion 78 which is bent forwardly having a face lying parallel to the main portion 77 but immediately in back of the annulus 51. A substantially U-shaped clip 79 is secured to the offset portion 78 straddling the annulus. This clip ordinarily does not touch the annulus; it is provided, however, to prevent disarrangement of the members when the arm 74 is actuated. A portion of the body 77 is bent forwardly at an angle of 90° forming a shelf 80 to which is clamped, by means of a plate 81 and a screw 82, one end of a flexure plate 83, the other end of which is riveted to a pawl 84 adapted to engage the ratchet teeth 60 of the sector 59. A finger 85 is also riveted to the plate 83 and the pawl 84, extending forwardly of the pawl 84 and overlying the end of a pawl 86 riveted to the end of a flexure plate 87 whose other end is clamped to a shelf-like projection 88 of a small angle bracket 89 which is fastened by means of screws 90 to one of the plates 44. A pin 91, which is studded into this bracket 89, pivotally supports an L-shaped member 92 having a finger 93 bent at right angles and normally positioned below the pawl 86. A pin 94, which is studded into the member 92 extending laterally therefrom, freely enters a hole near the lower end of a rod 95 whose upper end is guided in a bushing 96 penetrating the outer wall of the housing 24.

For the purpose of positively positioning the rod 95, a helical spring 97 is mounted circumjacently on this rod 95 between the wall of the housing 24 and a collar 98 locked to this rod 95. The bias of this spring assures that the rod 95 is always in its lowermost position and that a shoulder of a head 99, fastened thereto, engages a shoulder in the bushing 96.

Secured to the rear face of the offset portion 78 (Fig. VI) of the sheet metal member 76 but spaced therefrom, by means of a small block 103, is a flexure plate 102 to which is riveted a pawl 101, the end of which under the bias of the flexure plate 102 slidingly engages the rear face of the annulus 51. In the annulus 51, in predetermined position, in relation to its zero indicium, and in the path of the end of the pawl 101, is a rectangular aperture 100. When the annulus is rotated in an anticlockwise direction (as seen in Fig. III) by the synchronous motor of the clock mechanism and the pinion 53, the end of the pawl 101 enters the aperture 100 and the arm 74 and bracket 76, to which the pawl is fastened, are thus constrained to partake of its movement and this movement through the pawl 84 in engagement with one of the ratchet teeth is imparted to the sector 59, which thus rotates about its fulcrum until an end 104 of a crank lever 105 pivoted at 106 on a rearwardly extending bracket 107, also fastened to the rear face of the offset portion 78 of the sheet metal bracket 76, engages the end of an adjustable stop member 108 clamped to the plate 44. Further rotative movement of the annulus 51 and the bracket 76 now causes the crank 105 to rotate about its pivot 106, and the other arm 109 of this crank, by bending the flexure plate 102, withdraws the pawl 101 from the aperture 100, and a spring 110 (Fig. III), whose one end is attached to a longitudinally adjustable rod 111 and whose other end is secured at 112 to the arm 74, urges this arm and the bracket 76 in a clockwise direction until the bracket 76 engages a pin 123 projecting from an arm 124 fastened to the bar 47.

The driving pawl 84 (Figs. VI and III), secured to the bracket 76, is advanced into engagement with the next tooth in the sector 59 during the clockwise return movement of this bracket 76. The function of the pawl 86 is to hold the sector 59 against the bias of a spiral spring 117, whose one end is clamped at 118 to the sleeve 57 and whose other end is clamped at 119 to the sector 59, while the pawl 84 partakes of the clockwise movement of the bracket 76 and is being positioned to again rotate the sector 59 when at the expiration of 24 hours the pawl 101 again enters the aperture 100 in the annulus 51.

Since the number of days is not the same in every month it is necessary that the annulus 61 be returned to its starting position on the first day of every month by a manual operation. This is accomplished by the operator grasping the head 99 of the rod 95 (Fig. III) and pulling outwardly against the tension of the spring 97 thus raising the L-shaped member 92 and the finger 93 until the pawl 86 has been withdrawn from the ratchet tooth in which it was seated. Since the pawl 86 extends beneath the finger 85, which is riveted to the pawl 84, this pawl is also withdrawn and the bias of the spiral spring 117 rotates the sector 59 and the thereto attached annulus 61 until a bumper 120 (Fig. III), fixed to an ear of the sector 59, strikes the end of a screw 121 threaded through an arm 122 projecting downwardly from the bar 47. It is obvious that by adjusting the position of the screw 121 the "1" indicium in the series on the annulus 61 may be properly aligned with the indicia on the annulus 51 and on the sector 62. A fender 117a limits the distortion of the spring 117 when the movement of the sector 59 is stopped suddenly by impact of the bumper 120 upon the screw 121.

From the foregoing it will be seen that a single date indicium of the series on the annulus 61 is always properly aligned with the indicia on the members 43, 62', 51, for impression on records 116 inserted between the platens 114 and 115 (Fig. VII) of an imprinting mechanism such as is fully described in Patent 1,864,570 to L. S. Williams except during the short period required to shift the annulus 61 from one date to another. At this time two dates will be printed. This, however, does not cause confusion since this shift always takes place at midnight, at which time an indicium "12 M" (midnight) on the annulus 51 is also impressed on the record.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, a date-indicia-bearing annulus, a time-indicia-bearing annulus eccentrically mounted with respect to the first mentioned annulus, a plurality of rollers mounted in the space between the periphery of the first mentioned annulus and the second mentioned annulus for revolubly supporting the second mentioned annulus, said annuli being mounted for revolution in substantially the same plane and having their circumferences closely adjacent at one point, and means for periodically causing said date-indicia-bearing annulus to partake of the movement of said time-indicia-bearing annulus.

2. In a device for simultaneously recording variations in at least two different conditions, a rotatable annulus bearing indicia indicative of a condition, a second annulus mounted eccentrically with respect to the first mentioned annulus and bearing indicia indicative of a second condition, a plurality of rollers mounted in the space between the periphery of the first mentioned annulus and the second mentioned annulus for revolubly supporting the second mentioned annulus, means for periodically causing the first mentioned annulus to partake of the movement of the second mentioned annulus and means for simultaneously imprinting indicia borne by all said indicia-bearing annuli in juxtaposition on one recording medium.

HALVOR W. HEM.